(12) United States Patent
Sun (10) Patent No.: US 7,777,812 B2
(45) Date of Patent: Aug. 17, 2010

(54) METHODS AND SYSTEMS FOR PICTURE RESAMPLING

(75) Inventor: Shijun Sun, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1197 days.

(21) Appl. No.: 11/371,587

(22) Filed: Mar. 8, 2006

(65) Prior Publication Data

US 2007/0116131 A1 May 24, 2007

Related U.S. Application Data

(60) Provisional application No. 60/738,136, filed on Nov. 18, 2005.

(51) Int. Cl.
*H04N 5/50* (2006.01)
(52) U.S. Cl. ..................................................... 348/448
(58) Field of Classification Search ............. 375/240.01
See application file for complete search history.

(56) References Cited

U.S. PATENT DOCUMENTS

| 5,335,089 | A | * | 8/1994 | Xie et al. | 358/3.03 |
| 5,335,328 | A | * | 8/1994 | Dunn et al. | 710/33 |
| 5,553,171 | A | * | 9/1996 | Lin et al. | 382/299 |
| 5,587,742 | A | * | 12/1996 | Hau et al. | 348/441 |
| 6,185,594 | B1 | * | 2/2001 | Hilton et al. | 708/270 |
| 7,064,790 | B1 | * | 6/2006 | Varma et al. | 348/441 |
| 7,119,845 | B2 | * | 10/2006 | Lafon | 348/441 |
| 7,437,018 | B1 | * | 10/2008 | Amirghodsi | 382/293 |
| 7,466,900 | B2 | * | 12/2008 | Sugiyama | 386/68 |
| 7,570,305 | B2 | * | 8/2009 | Joskin | 348/572 |
| 2007/0140354 | A1 | * | 6/2007 | Sun | 375/240.24 |

OTHER PUBLICATIONS

Edouard Francois, Extended spatial scalability, International Organisation for Standardisation Organisation Internationale De Normalisation,ISO/IEC JTC1/SC29/WG11, Coding of Moving Pictures and Audio, ISO/IEC JTC1/SC29/WG11, MPEG2005/M11669, Jan. 2005, Hong Kong, China.
International Organisation for Standardisation, Organisation Internationale De Normalisation, Coding of Moving Pictures and Audio, ISO/IEC JTC1/SC29/WG11/N6898, Hong Kong, Jan. 2005.
Joint Video Team (JVT) of ISO/IEC MPEG & ITU-T VCEG, (ISO/IEC JTC1/SC29/WG11 and ITU-T SG16 Q.6), Working Draft 1.0 of 14496-10:200x/AMD1 Scalable Video Coding International Organization for Standardization,Organisation Internationale Normalisation, Coding of Moving Pictures and Audio, ISO/IEC JTC 1/SC 29/WG 11 N6901, Jan. 2005, Hong Kong, China "relevant sections 5 and 6".
Ken Turkowski, "Filters for Common Resampling Tasks", Graphics Gems I, Academic Press, Apple Computer, Apr. 1990.

* cited by examiner

*Primary Examiner*—Paulos M Natnael
(74) *Attorney, Agent, or Firm*—Krieger Intellectual Property, Inc.; Scott C. Krieger (57) ABSTRACT

Embodiments of the present invention comprise systems and methods for picture up-sampling and picture down-sampling. Some embodiments of the present invention provide an up-sampling and/or down-sampling procedure designed for the Scalable Video Coding extension of H.264/MPEG-4 AVC.

8 Claims, 7 Drawing Sheets

METHODS AND SYSTEMS FOR PICTURE RESAMPLING

RELATED REFERENCES

This application claims the benefit of U.S. Provisional Patent Application No. 60/738,136, entitled "Methods and Systems for Up-sampling and Down-sampling of Interlaced Materials," filed Nov. 18, 2005, invented by Shijun Sun.

FIELD OF THE INVENTION

Embodiments of the present invention comprise methods and systems for picture resampling. Some embodiments of the present invention comprise methods and systems for picture resampling for spatially scalable video coding.

BACKGROUND

H.264/MPEG-4 AVC [Joint Video Team of ITU-T VCEG and ISO/IEC MPEG, "Advanced Video Coding (AVC)-4$^{th}$ Edition," ITU-T Rec. H.264 and ISO/IEC 14496-10 (MPEG4-Part 10), January 2005], which is incorporated by reference herein, is a video codec specification that uses macroblock prediction followed by residual coding to reduce temporal and spatial redundancy in a video sequence for compression efficiency. Spatial scalability refers to a functionality in which parts of a bitstream may be removed while maintaining rate-distortion performance at any supported spatial resolution. Single-layer H.264/MPEG-4 AVC does not support spatial scalability. Spatial scalability is supported by the Scalable Video Coding (SVC) extension of H.264/MPEG-4 AVC.

The SVC extension of H.264/MPEG-4 AVC [Working Document 1.0 (WD-1.0) (MPEG Doc. N6901) for the Joint Scalable Video Model (JSVM)], which is incorporated by reference herein, is a layered video codec in which the redundancy between spatial layers is exploited by inter-layer prediction mechanisms. Three inter-layer prediction techniques are included into the design of the SVC extension of H.264/MPEG-4 AVC: inter-layer motion prediction, inter-layer residual prediction, and inter-layer intra texture prediction.

Previously, only dyadic spatial scalability was addressed by SVC. Dyadic spatial scalability refers to configurations in which the ratio of picture dimensions between two successive spatial layers is a power of 2. New tools that manage configurations in which the ratio of picture dimensions between successive spatial layers is not a power of 2 and in which the pictures of the higher level can contain regions that are not present in corresponding pictures of the lower level, referred to as non-dyadic scaling with cropping window, have been proposed.

All of the inter-layer prediction methods comprise picture up-sampling. Picture up-sampling is the process of generating a higher resolution image from a lower resolution image. Some picture up-sampling processes comprise sample interpolation. The prior up-sampling process used in the SVC design was based on the quarter luma sample interpolation procedure specified in H.264 for inter prediction. When applied to spatially scalable coding, the prior method has the following two drawbacks: the interpolation resolution is limited to quarter samples, and thus, is not supportive of non-dyadic scaling; and half-sample interpolation is required in order to get a quarter-sample position making this method computationally cumbersome. A picture up-sampling process that overcomes these limitations is desired.

SUMMARY

Some embodiments of the present invention are related to the Scalable Video Coding (SVC) extension of H.264/AVC. The SVC extension of H.264 currently (in Joint Draft version 4) only addresses spatial scalability between progressive video sequences (or frames).

Some embodiments of the present invention relate to the resampling (down-/up-sampling) processes involving interlaced materials.

Some embodiments of the present invention comprise picture up-sampling accomplished through direct interpolation using filter coefficients selected based on the phase of the location of the pixel to be interpolated.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

H.264/MPEG-4 AVC [Joint Video Team of ITU-T VCEG and ISO/IEC MPEG, "Advanced Video Coding (AVC)-4$^{th}$ Edition," ITU-T Rec. H.264 and ISO/IEC 14496-10 (MPEG4-Part 10), January 2005] is incorporated herein by reference.

The SVC extension of H.264/MPEG-4 AVC [Working Document 1.0 (WD-1.0) (MPEG Doc. N6901) for the Joint Scalable Video Model (JSVM)] is incorporated herein by reference.

For the purposes of this specification and claims, the term "picture" may comprise an array of pixels, a digital image, a subdivision of a digital image, a data channel of a digital image or another representation of image data.

Figure 1:
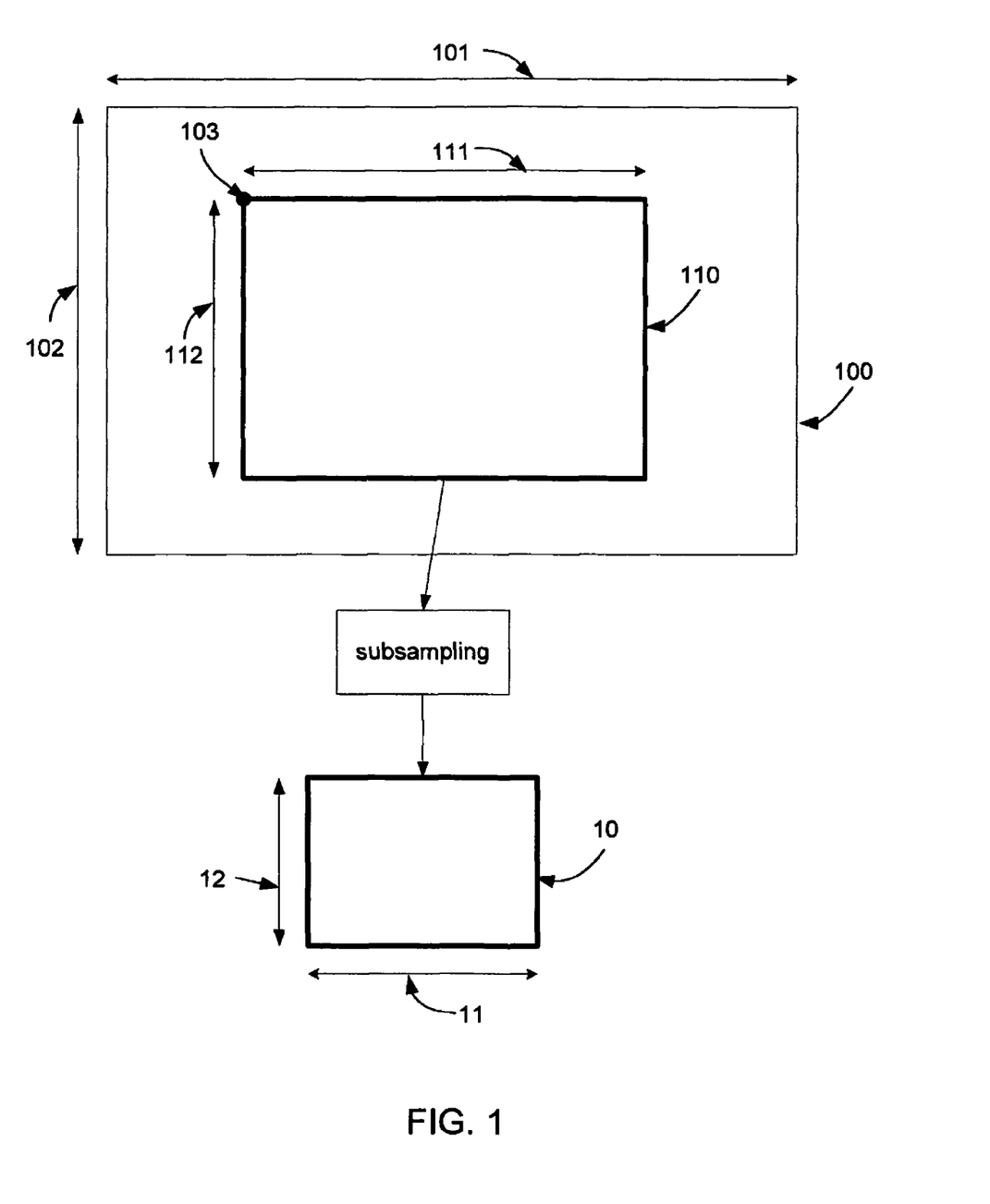
FIG. 1 is diagram illustrating the geometrical relationship between an enhancement layer and a base layer.

FIG. 1 shows two pictures corresponding to an image picture: a lower spatial picture 10, also referred to as a base spatial picture or base-layer picture, and a higher spatial picture 100, also referred to as an enhancement spatial picture or enhancement-layer picture. The base spatial picture 10 may have lower spatial resolution than the enhancement spatial picture 100, as shown in FIG. 1. The base spatial picture 10 may not include the same spatial region as that of the enhancement spatial picture 100, as shown in FIG. 1. Shown in FIG. 1 is a base spatial picture 10 corresponding to a spatial region 110 cropped from the enhancement spatial picture 100. The base-layer picture 10 may be an interlaced-frame picture comprising an upper and a lower field, or a progressive-frame picture. The enhancement-layer picture 100 may be an interlaced-frame picture comprising an upper and a lower field, or a progressive-frame picture In some embodiments of the present invention, the base spatial picture and the enhancement spatial picture may correspond to two spatial layers in a scalable video coder/decoder (codec).

The width 101 of the enhancement spatial picture 100 and the height 102 of the enhancement spatial picture 100 may be denoted $w_{enh}$ and $h_{enh}$, respectively. The width 11 and the height 12 of the base spatial picture 10 may be denoted $w_{base}$ and $h_{base}$ respectively. The base spatial picture 10 may be a sub-sampled version of a sub-region 110 of the enhancement spatial picture 100 positioned at enhancement spatial picture coordinates ($x_{orig}$, $y_{orig}$) 103. The position 103 represents the position of the upper-left corner of the cropping window 110. The width 111 and the height 112 of the sub-region 110 may be denoted $w_{extract}$ and $h_{extract}$, respectively. The parameters ($x_{orig}$, $y_{orig}$, $w_{extract}$, $h_{extract}$, $w_{base}$, $h_{base}$) define the relationship between the higher spatial picture 100 and the lower spatial picture 10.

Figure 2:
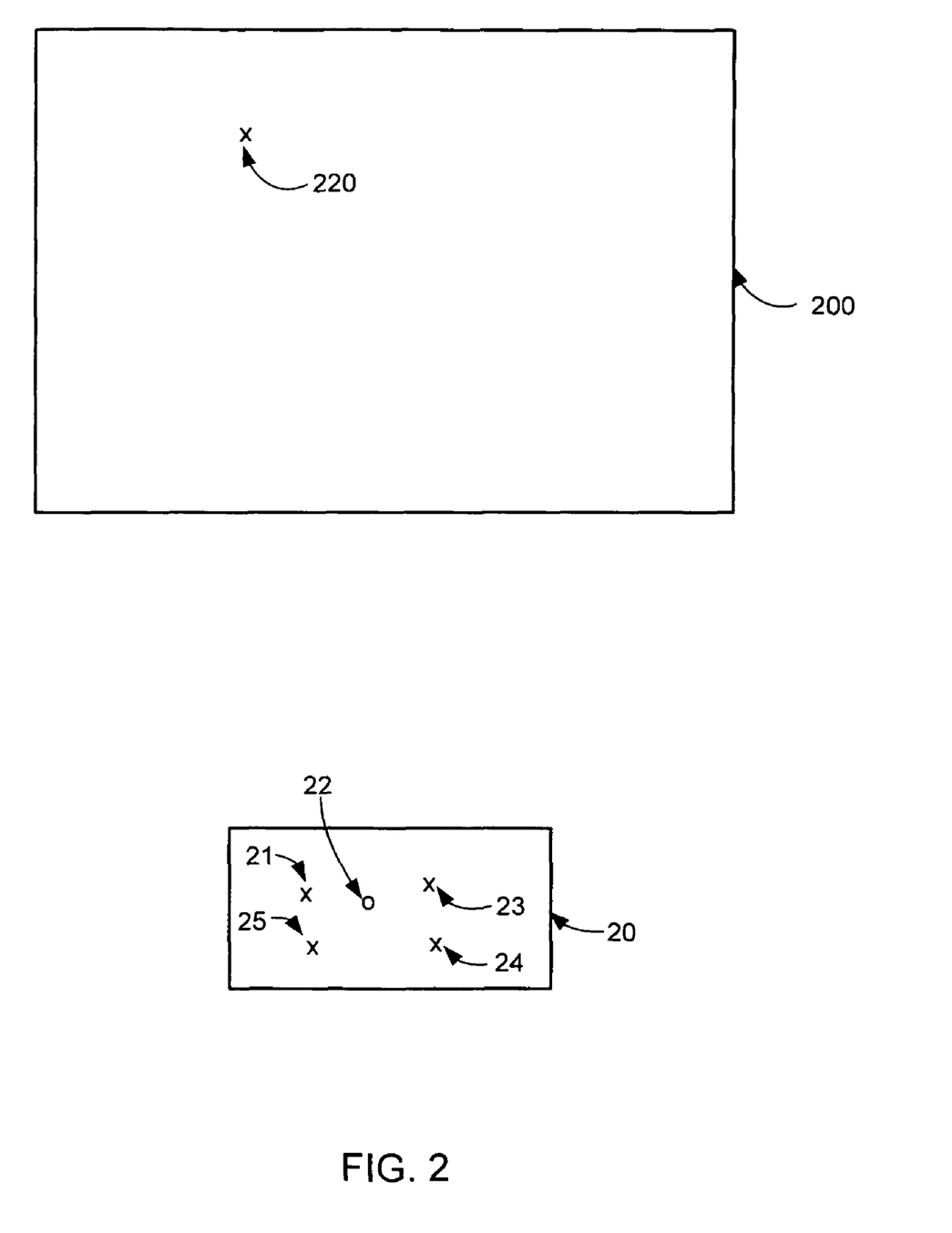
FIG. 2 is a diagram showing the relative location of a sample in an enhancement layer and a base layer.

Picture up-sampling may refer to the generation of a higher spatial resolution image from a lower spatial resolution image. In some embodiments, up-sampling may refer to increasing resolution in any dimension not limited to spatial dimensions or a temporal dimension. FIG. 2 shows a pixel location 220 in a higher spatial resolution image 200. In FIG. 2, pixel location 220 has a corresponding location 22 in the lower spatial resolution image 20. The location 220 may align directly with a pixel location in the lower spatial resolution image 20, or it may not align directly with a pixel location in the lower spatial resolution image 20. In FIG. 2, the location 22 is shown located between four base-layer pixels, 21, 23, 24, and 25.

Some embodiments of the present invention comprise methods and systems for direct interpolation of the pixels of the enhancement spatial picture 200 given the base spatial picture 20 wherein the ratios of dimensions are not limited to a power of 2. Some embodiments of the present invention comprise up-sampling on the entire picture of the base spatial picture 20. Other embodiments of the present invention comprise block-by-block up-sampling of the base spatial picture 20. Some embodiments of the present invention comprise up-sampling in one direction followed by up-sampling in another direction. For up-sampling, determining the corresponding location in the base-layer picture of a sample position in the enhancement layer may be required. This determination may depend on the format, progressive or interlace, of the base-layer picture and the enhancement-layer picture.

Some embodiments of the present invention comprise methods and systems for direct interpolation of the pixels of the base spatial picture 20 given the enhancement spatial picture 200 wherein the ratios of dimensions are not limited to a power of 2. Some embodiments of the present invention comprise down-sampling on the entire picture of the enhancement spatial picture 200. Other embodiments of the present invention comprise block-by-block down-sampling of the base spatial picture 200. Some embodiments of the present invention comprise down-sampling in one direction followed by down-sampling in another direction. For down-sampling, determining the corresponding location in the enhancement-layer picture of a sample position in the base layer may be required. This determination may depend on the format, progressive or interlace, of the base-layer picture and the enhancement-layer picture.

Progressive-Material Embodiments

If both the base-layer picture and the enhancement-layer picture are progressive frames, then for a sample position (x, y) in the enhancement spatial picture in units of integer samples, the corresponding position ($p_{x,L}(x)$, $p_{y,L}(y)$) in the base spatial picture, in units of $$\frac{1}{R_L}$$

samples, may be given by:

$$\begin{cases} p_{x,L}(x) = \left[(x - x_{orig}) \cdot w_{base} \cdot R_L + \frac{R_L}{2}(w_{base} - w_{extract})\right] / w_{extract} \\ p_{y,L}(y) = \left[(y - y_{orig}) \cdot h_{base} \cdot R_L + \frac{R_L}{2}(h_{base} - h_{extract})\right] / h_{extract} \end{cases} \quad (1)$$

where the parameters ($x_{orig}$, $y_{orig}$, $w_{extract}$, $h_{extract}$, $w_{base}$, $h_{base}$) define the relationship between the higher spatial picture 100 and the lower spatial picture 10, as in FIG. 1, and $R_L$ is the interpolation resolution. Some embodiments comprise one-sixteenth-sample resolution interpolation, and in such embodiments $R_L$ is 16.

In some embodiments, the corresponding position ($p_{x,L}(x)$, $p_{y,L}(y)$) in the base spatial picture 10 may be given by:

$$\begin{cases} p_{x,L}(x) = \left[(x - x_{orig}) \cdot w_{base} \cdot R_L + \frac{R_L}{2}(w_{base} - w_{extract})\right] // w_{extract} \\ p_{y,L}(y) = \left[(y - y_{orig}) \cdot h_{base} \cdot R_L + \frac{R_L}{2}(h_{base} - h_{extract})\right] // h_{extract} \end{cases} \quad (1a)$$

where, as above, the parameters ($x_{orig}$, $y_{orig}$, $w_{extract}$, $h_{extract}$, $w_{base}$, $h_{base}$) define the relationship between the higher spatial picture 100 and the lower spatial picture 10, as in FIG. 1, $R_L$ is the interpolation resolution, and "//" comprises a computationally simplified division operation, such as integer division with rounding. The sample positions may not be limited to powers of 2, and direct calculation of a sample position allows for direct interpolation of picture values at that sample position.

For interpolation resolution of $R_L=16$, the corresponding position in the base-layer picture becomes:

$$\begin{cases} p_{x,L}(x) = [(x - x_{orig}) \cdot w_{base} \cdot 16 + 8 \cdot (w_{base} - w_{extract})] // w_{extract} \\ p_{y,L}(y) = [(y - y_{orig}) \cdot h_{base} \cdot 16 + 8 \cdot (h_{base} - h_{extract})] // h_{extract} \end{cases} \quad (1b)$$

as described above with $R_L=16$.

For a chroma sample position $(x_c, y_c)$ in the enhancement picture in units of single chroma samples, its corresponding position in the base picture $(p_{x,c}(x_c), p_{y,c}(y_c))$ in units of one-sixteenth chroma samples of the base picture may be derived as:

$$\begin{cases} p_{x,c}(x_c) = \left[(x_c - x_{orig,c}) \cdot w_{base,c} \cdot R_C + \frac{R_C}{4}(2 + p_{enh,x})w_{base,c} - \frac{R_C}{4}(2 + p_{base,x})w_{extract,c}\right] // w_{extract,c} \\ p_{y,c}(x_c) = \left[(y_c - y_{orig,c}) \cdot h_{base,c} \cdot R_C + \frac{R_C}{4}(2 + p_{enh,y})h_{base,c} - \frac{R_C}{4}(2 + p_{base,y})h_{extract,c}\right] // h_{extract,c} \end{cases} \quad (2)$$

in which $R_C=16$, $(x_{orig,c}, y_{orig,c})$ represents the position of the upper-left corner of the cropping window in the current picture in units of single chroma samples of current picture, $(w_{base,c}, h_{base,c})$ is the resolution of the base picture in units of single chroma samples of the base picture, $(w_{extract,c}, h_{extract,c})$ is the resolution of the cropping window in units of the single chroma samples of current picture, $(p_{base,x}, p_{base,y})$ represents the relative chroma phase shift of the base picture in units of quarter chroma samples of the base picture, and $(p_{enh,x}, p_{enh,y})$ represents the relative chroma phase shift of the current picture in units of quarter chroma samples of the current picture.

Similarly, when the interpolation resolution is $R_L=16$, the corresponding position in the base picture $(p_{x,c}, p_{y,c})$ in units of 1/16 chroma samples of the base picture becomes:

$$\begin{cases} p_{x,c}(x_c) = [(x_c - x_{orig,c}) \cdot w_{base,c} \cdot 16 + 4 \cdot (2 + p_{enh,x})w_{base,c} - 4 \cdot (2 + p_{base,x})w_{extract,c}] // w_{extract,c} \\ p_{y,c}(x_c) = [(y_c - y_{orig,c}) \cdot h_{base,c} \cdot 16 + 4 \cdot (2 + p_{enh,y})h_{base,c} - 4(2 + p_{base,y})h_{extract,c}] // h_{extract,c} \end{cases} \quad (2a)$$

where $(x_{orig,c}, y_{orig,c})$ represents the position of the upper-left corner of the cropping window in the enhancement picture in units of single chroma samples of the current picture, $(w_{base,c}, h_{base,c})$ is the resolution of the base picture in units of single chroma samples of the base picture, $(w_{extract,c}, h_{extract,c})$ is the resolution of the cropping window in units of the single chroma samples of enhancement picture, $(p_{base,x}, p_{base,y})$ represents the relative chroma phase position of the base picture in units of quarter chroma samples of the base picture, and $(p_{enh,x}, p_{enh,y})$ represents the relative chroma phase position of the enhancement picture in units of quarter chroma samples of the enhancement picture.

Based on the phase positions derived by Eqs. 1-2, up-sampling filters can be chosen, in some embodiments, from a pre-defined filter table for the interpolation process. Details are described in a section below. Other filter selection and/or calculation processes, which are related to the phase position, may also be used.

Given a luma sample in the low-resolution picture at position (x, y) in units of single luma samples of the low-resolution picture, its corresponding position in the high-resolution picture $(p_{x,L}, p_{y,L})$ in units of one-sixteenth luma samples of the high-resolution picture may be derived as:

$$\begin{cases} p_{x,L} = 16 \cdot x_{orig} + [x \cdot w_{extract} \cdot 16 + 8 \cdot (w_{extract} - w_{base})] // w_{base} \\ p_{y,L} = 16 \cdot y_{orig} + [y \cdot h_{extract} \cdot 16 + 8 \cdot (h_{extract} - h_{base})] // h_{base} \end{cases} \quad (3)$$

Given a chroma sample in the low-resolution picture at position $(x_c, y_c)$ in units of single chroma samples of the low-resolution picture, its corresponding position in the high-resolution picture $p_{x,c}, p_{y,c}$) in units of one-sixteenth chroma samples of the high-resolution picture may be derived as:

$$\begin{cases} p_{x,c} = 16 \cdot x_{orig,c} + [x \cdot w_{extract,c} \cdot 16 + 4 \cdot (2 + p_{base,x})w_{extract,c} - 4(2 + p_{enh,x})w_{base,c}] // w_{base} \\ p_{y,c} = 16 \cdot y_{orig,c} + [y \cdot h_{extract,c} \cdot 16 + 4 \cdot (2 + p_{base,y})h_{extract,c} - 4(2 + p_{enh,y})h_{base,c}] // h_{base}. \end{cases} \quad (4)$$

Based on sampling position derived from Eqs. 3-4, down-sampling filters can be selected from a pre-defined set of filters, in some embodiments. However, the down-sampling process is not a normative part of the SVC.

Interlaced Material Embodiments

Some embodiments of the present invention are related to the Scalable Video Coding (SVC) extension of H.264/AVC.

The SVC extension of H.264 currently (in Joint Draft version 4) only addresses spatial scalability between progressive video sequences (or frames). Some embodiments of the present invention address issues related to the resampling (down-/up-sampling) processes involving interlaced materials.

Some embodiments of the present invention comprise solutions for field-to-frame, frame-to-field, and field-to-field resampling processes. Some of these embodiments relate to a direct interpolation method with an interpolation resolution of 1/16 sample, however other interpolation resolutions and methods may be used.

Resampleing of Interlaced Materials

In some embodiments of the present invention, which handle interlaced materials, it may be assumed that all parameters ($x_{orig}$, $y_{orig}$, $w_{extract}$, $h_{extract}$, $w_{base}$, $h_{base}$), ($p_{base,x}$, $p_{base,y}$), and ($p_{enh,x}$, $p_{enh,y}$) be defined as above for frame-based pictures; additionally, ($y_{orig}$, $h_{extract}$) shall be multiples of 4. The following two new parameters $\phi_{enh,y}$ and $\phi_{base,y}$ may be used and defined for the generalized resampling processes.

$$\phi_{enh,y} = \begin{cases} p_{enh,y} - 1 & \text{for enhancement top\_filed}(4{:}2{:}0) \\ p_{enh,y} + 1 & \text{for enhancement bot\_field}(4{:}2{:}0) \\ 2 \cdot p_{enh,y} & \text{otherwise (enhancement frame, etc.)} \end{cases} \quad (5)$$

$$\phi_{base,y} = \begin{cases} p_{base,y} - 1 & \text{for base top\_filed}(4{:}2{:}0) \\ p_{base,y} + 1 & \text{for base bot\_field}(4{:}2{:}0) \\ 2 \cdot p_{base,y} & \text{otherwise (base frame, etc.)} \end{cases} \quad (6)$$

The parameters $\phi_{enh,y}$ and $\phi_{base,y}$ represent the chroma vertical phase position in units of 1/8 chroma samples of the enhancement and base pictures (either field or frame), respectively.

Field-to-Field Resampling

In some embodiments, it may be required that the two corresponding field pictures be of the same parity (i.e., either top or bottom), although, in some other embodiments, these exemplary equations may be slightly modified to support cross-parity resampling. An exemplary application for field-to-field resampling is SD-to-1080i scalable coding.

Given a luma sample in the cropping window of the enhancement field at position (x, y) in units of single luma samples, its corresponding position in the base field ($p_{x,L}(l)$, $p_{y,L}(y)$) in units of 1/16 luma samples of the base field can be derived as:

$$\begin{cases} p_{x,L}(x) = [(x - x_{orig}) \cdot w_{base} \cdot 16 + 8 \cdot (w_{base} - w_{extract})] \mathbin{/\mkern-6mu/} w_{extract} \\ p_{y,L}(y) = [(y - y'_{orig}) \cdot h_{base} \cdot 16 + 8 \cdot (h_{base} - h_{extract})] \mathbin{/\mkern-6mu/} h_{extract} \end{cases} \quad (7)$$

with $$y'_{orig} = \frac{y_{orig}}{2}.$$

Similarly, given a chroma sample in the enhancement picture at position ($x_c$, $y_c$) in units of single chroma samples, its corresponding position in the base picture ($p_{x,c}(x_c)$, $p_{y,c}(y_c)$) in units of 1/16 chroma samples of the base picture can be derived as $$\begin{cases} p_{x,c} = [(x_c - x_{orig,c}) \cdot w_{base,c} \cdot 16 + 4 \cdot (2 + p_{enh,x})w_{base,c} - 4 \cdot (2 + p_{base,x})w_{extract,c}] \mathbin{/\mkern-6mu/} w_{extract,c} \\ p_{y,c} = [(y'_c - y_{orig,c}) \cdot h_{base,c} \cdot 16 + 2 \cdot (4 + \phi_{enh,y})h_{base,c} - 2 \cdot (4 + \phi_{base,y})h_{extract,c}] \mathbin{/\mkern-6mu/} h_{extract,c} \end{cases} \quad (8)$$

with $y'_{orig,c} = \dfrac{y_{orig,c}}{2}.$

Based on the phase positions derived by Eqs. 7-8, up-sampling filters can be chosen from a pre-defined filter table, as described in exemplary embodiments above, for the interpolation process.

Similar to the up-sampling process, given a luma sample in the low-resolution field at position (x, y) in units of single luma samples of the low-resolution picture, its corresponding position in the high-resolution field ($p_{x,L}$, $p_{y,L}$) in units of one-sixteenth luma samples of the high-resolution field can be derived as $$\begin{cases} p_{x,L} = 16 \cdot x_{orig} + [x \cdot w_{extract} \cdot 16 + 8 \cdot (w_{extract} - w_{base})] \mathbin{/\mkern-6mu/} w_{base} \\ p_{y,L} = 16 \cdot y'_{orig} + [y \cdot h_{extract} \cdot 16 + 8 \cdot (h_{extract} - h_{base})] \mathbin{/\mkern-6mu/} h_{base} \end{cases} \quad (9)$$

Given a chroma sample in the low-resolution field at position ($x_c$, $y_c$) in units of single chroma samples of the low-resolution picture, its corresponding position in the high-resolution field $p_{x,c}$, $p_{y,c}$) in units of one-sixteenth chroma samples of the high-resolution field can be derived as $$\begin{cases} p_{x,c} = 16 \cdot x_{orig,c} + [x_c \cdot w_{extract,c} \cdot 16 + 4 \cdot (2 + p_{base,x})w_{extract,c} - 4 \cdot (2 + p_{enh,x})w_{base,c}] \mathbin{/\mkern-6mu/} w_{base,c} \\ p_{y,c} = 16 \cdot y'_{orig,c} + [y_c \cdot h_{extract,c} \cdot 16 + 2 \cdot (4 + \phi_{base,y})h_{extract,c} - 2 \cdot (4 + \phi_{enh,y})h_{base,c}] \mathbin{/\mkern-6mu/} h_{base,c} \end{cases} \quad (10)$$

Based on sampling positions derived from Eqs. 9-10, down-sampling filters can be selected or calculated. In some embodiments, filters may be selected from a pre-defined set of filters.

The resampling process defined in this subsection can also be used for frame-to-frame resampling, where both frames are interlaced materials. In these cases, the field-to-field resampling may be applied to the top field pair and the bottom field pair, respectively.

Field-to-Frame Resampling

For field-to-frame resampling, in some embodiments, it may be assumed that the base picture is a field and the enhancement picture is a coincided frame. An exemplary application for field-to-frame resampling is SD-to-720p scalable coding.

In some embodiments, resampling design may be simplified by breaking down each of the up- and down-sampling processes into two stages, respectively.

For up-sampling, a field is up-sampled to a first field of the same parity using methods described above in relation to field-to-field resampling. Then the opposite parity field in the enhancement frame may be generated by interpolating the first field using a symmetric even-tap filter along the vertical direction. In some embodiments, a default filter for H.264 1/2-sample interpolation may be applied.

Figure 6:
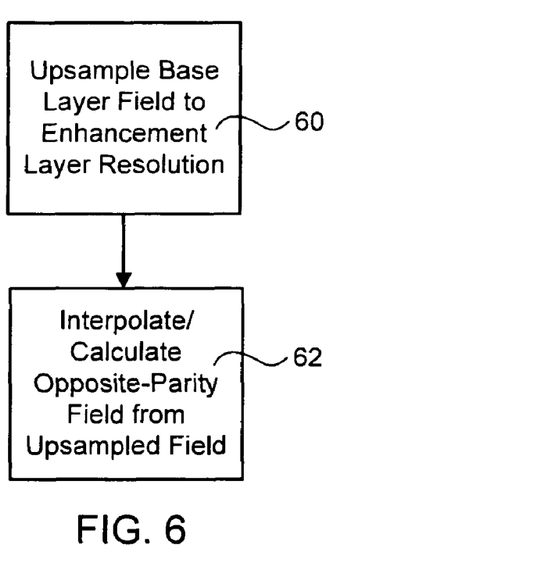
FIG. 6 is a diagram illustrating an embodiment of the present invention comprising field interpolation.

Some embodiments of the present invention may be described with reference to FIG. 6. In these embodiments, a base layer field is upsampled 60 to an enhancement layer resolution. This upsampled field is then interpolated or otherwise modified to generate 62 an opposite-parity field. These matching fields may be combined to form an interlaced frame. In some embodiments, these fields may be processed to form a progressive frame.

Figure 7:
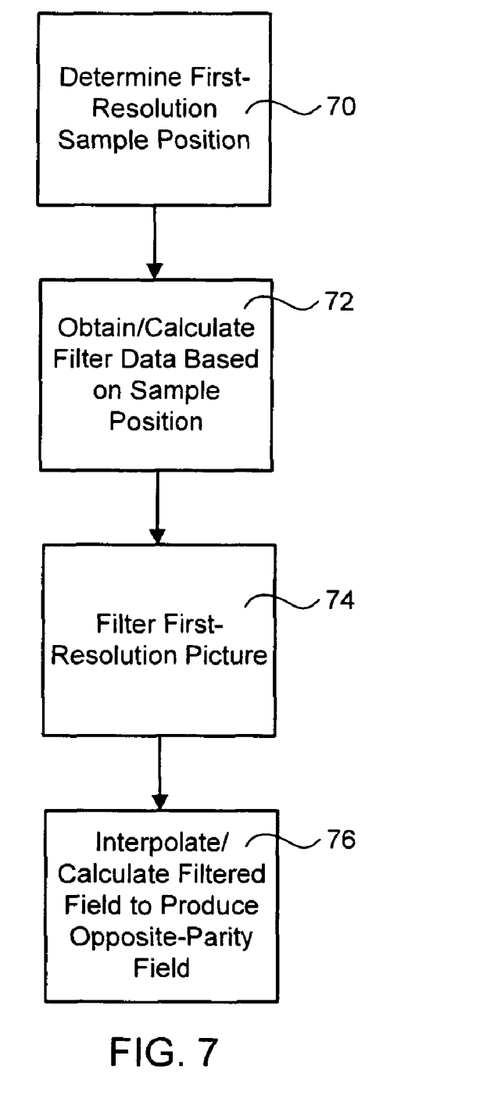
FIG. 7 is a diagram illustrating an embodiment of the present invention comprising field interpolation and filter data selection based on sample position.

In some embodiments of the present invention, illustrated in FIG. 7, a first resolution sample position corresponding to a second resolution location is determined 70. The first resolution sample position corresponding to the second resolution location may be an intermediate position between the pixels of a first resolution layer, such as a base layer. Based on this position, filter data may be obtained, selected or calculated 72. This filter data may then be used to filter 74 the first-resolution picture to produce a second resolution picture or field. In some embodiments, these pictures will be corresponding fields of an interlaced image. This second-resolution field may then be interpolated or otherwise processed to produce an opposite-parity field 76. The pair of second resolution fields may then make up an interlaced frame or may be further processed to make a progressive frame or some other image.

Figure 8:
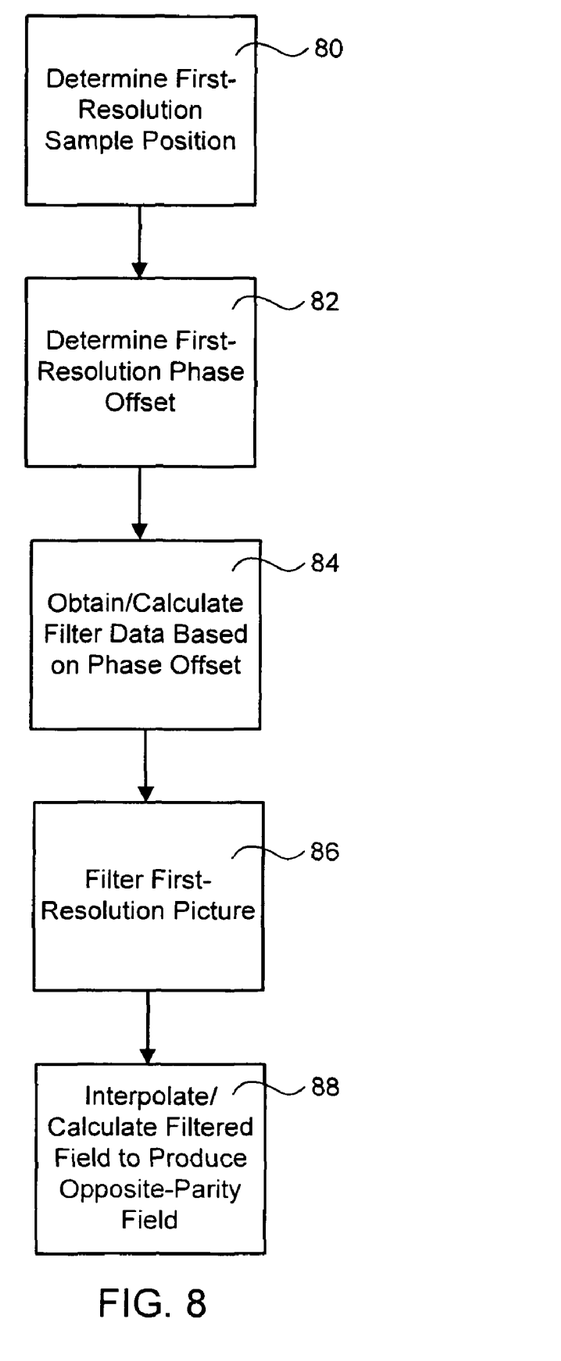
FIG. 8 is a diagram illustrating an embodiment of the present invention comprising field interpolation and filter data selection based on sample position phase.

Some embodiments of the present invention may be described with reference to FIG. 8. In these embodiments, a first-resolution sample position may be determined 80 as was done in the previous exemplary embodiment described in relation to FIG. 7. A first-resolution phase offset may then be calculated 82 to describe the offset between a first-resolution pixel and the first-resolution sample position. This phase offset may then be used to select, obtain or calculate filter data 84. This filter data may then be used to filter the first-resolution picture 86 thereby producing a second-resolution filtered field. This filtered field may then be interpolated or otherwise processed to produce an opposite-parity field 88. These fields may then be further processed as described for other embodiments.

For down-sampling, a frame may first be down-sampled vertically to preserve the field of the same parity of the base field picture. Then the enhancement field may be down-sampled following processes described above in relation to field-to-field resampling. In some embodiments, a simple solution for the first step vertical down-sampling is to simply discard all even or odd lines of the frame.

Frame-to-Field Resampling

In some embodiments, for frame-to-field resampling, it may be assumed that the base picture is a frame and the enhancement picture is a field; additionally, the base frame may be coincided with the enhancement field. Processes described above in relation to field-to-field resampling can be applied for the scenario with slight modifications.

Given a luma sample in the cropping window of the enhancement field at position (x, y) in units of single luma samples, its corresponding position in the base frame $(p_{x,L}(x), p_{y,L}(y))$ in units of 1/16 luma samples of the base frame may be derived as:

$$\begin{cases} p_{x,L}(x) = [(x - x_{orig}) \cdot w_{base} \cdot 16 + 8 \cdot (w_{base} - w_{extract})] \mathbin{/\mkern-6mu/} w_{extract} \\ p_{y,L}(y) = [(y - y'_{orig}) \cdot h'_{base} \cdot 16 + 8 \cdot (h'_{base} - h_{extract})] \mathbin{/\mkern-6mu/} h_{extract} \end{cases} \quad (11)$$

with $$y'_{orig} = \frac{y_{orig}}{2} \text{ and } h'_{base} = 2 \cdot h_{base}.$$

Similarly, given a chroma sample in the enhancement picture at position $(x_c, y_c)$ in units of single chroma samples, its corresponding position in the base picture $(p_{x,c}(x_c), p_{y,c}(y_c))$ in units of 1/16 chroma samples of the base picture may be derived as:

$$\begin{cases} p_{x,c}(x_c) = [(x_c - x_{orig,c}) \cdot w_{base,c} \cdot 16 + 4 \cdot (2 + p_{enh,x}) w_{base,c} - 4 \cdot (2 + p_{base,x}) w_{extract,c}] \mathbin{/\mkern-6mu/} w_{extract,c} \\ p_{y,c}(y_c) = [(y_c - y'_{orig,c}) \cdot h'_{base,c} \cdot 16 + 2 \cdot (4 + \phi_{enh,y}) h'_{base,c} - 2 \cdot (4 + \phi_{base,y}) h_{extract,c}] \mathbin{/\mkern-6mu/} h_{extract,c} \end{cases} \quad (12)$$

with $$y'_{orig,c} = \frac{y_{orig,c}}{2} \text{ and } h'_{base,c} = 2 \cdot h_{base,c}.$$

Similarly, given a luma sample in the low-resolution frame at position (x, y) in units of single luma samples of the low-resolution picture, its corresponding position in the high-resolution field $(p_{x,L}, p_{y,L})$ in units of one-sixteenth luma samples of the high-resolution field may be derived as:

$$\begin{cases} p_{x,L} = 16 \cdot x_{orig} + [x \cdot w_{extract} \cdot 16 + 8 \cdot (w_{extract} - w_{base})] \mathbin{/\mkern-6mu/} w_{base} \\ p_{y,L} = 16 \cdot y'_{orig} + [y \cdot h_{extract} \cdot 16 + 8 \cdot (h_{extract} - h'_{base})] \mathbin{/\mkern-6mu/} h'_{base} \end{cases} \quad (13)$$

Given a chroma sample in the low-resolution frame at position $(x_c, y_c)$ in units of single chroma samples of the low-resolution picture, its corresponding position in the high-resolution field $(p_{x,c}, p_{y,c})$ in units of one-sixteenth chroma samples of the high-resolution field may be derived as:

$$\begin{cases} p_{x,c} = 16 \cdot x_{orig,c} + [x_c \cdot w_{extract,c} \cdot 16 + 4 \cdot (2 + p_{base,x}) w_{extract,c} - 4 \cdot (2 + p_{enh,x}) w_{base,c}] \mathbin{/\mkern-6mu/} w_{base,c} \\ p_{y,c} = 16 \cdot y'_{orig,c} + [y_c \cdot h_{extract,c} \cdot 16 + 2 \cdot (4 + \phi_{base,y}) h_{extract,c} - 2 \cdot (4 + \phi_{enh,y}) h'_{base,c}] \mathbin{/\mkern-6mu/} h'_{base,c} \end{cases} \quad (14)$$

Eqs. 11-14 can also be backward compatible with Eqs. 1-4, and therefore, the proposed field-to-frame resampling process may be related to the frame-to-frame resampling process.

Frame-to-Frame Resampling—Special Case

A special case for frame-to-frame resampling is that the base progressive frame is coincided with a field of the enhancement frame (of two fields with different presentation time codes).

The two-stage processes described above in relation to field-to-frame resampling can be applied together with the process described above in relation to frame-to-field resampling.

Interpolation—Up-Sampling

In some embodiments, interpolating the enhancement-layer image value at sample position (x, y) in the enhancement spatial picture comprises a filtering process. The filtering process may further comprise determining interpolation-filter coefficients from a look-up-table wherein the index into the look-up-table may be related to the interpolation position determined by $(p_{x,L}(x), p_{y,L}(y))$.

In some embodiments, the interpolation filter may be a 4-tap filter. In some embodiments, the interpolation filter may be a 6-tap filter. In some embodiments, the filter coefficents may be dirived from the two-lobed or three-lobed Lanczos-windowed sinc functions.

Table 1 and Table 2 comprise exemplary look-up-tables of interpolation-filter coefficents for a 16-phase 6-tap interpolation filter wherein the phase corresponds to the interpolation position determined by $(p_{x,L}(x), p_{y,L}(y))$.

TABLE 1

| phase | (6-tap) interpolation filter coefficients | | | | | |
|---|---|---|---|---|---|---|
| | e[−2] | e[−1] | e[0] | e[1] | e[2] | e[3] |
| 0 | 0 | 0 | 32 | 0 | 0 | 0 |
| 1 | 0 | −2 | 32 | 2 | 0 | 0 |
| 2 | 1 | −3 | 31 | 4 | −1 | 0 |
| 3 | 1 | −4 | 30 | 7 | −2 | 0 |
| 4 | 1 | −4 | 28 | 9 | −2 | 0 |
| 5 | 1 | −5 | 27 | 11 | −3 | 1 |
| 6 | 1 | −5 | 25 | 14 | −3 | 0 |
| 7 | 1 | −5 | 22 | 17 | −4 | 1 |
| 8 | 1 | −5 | 20 | 20 | −5 | 1 |
| 9 | 1 | −4 | 17 | 22 | −5 | 1 |
| 10 | 0 | −3 | 14 | 25 | −5 | 1 |
| 11 | 1 | −3 | 11 | 27 | −5 | 1 |
| 12 | 0 | −2 | 9 | 28 | −4 | 1 |
| 13 | 0 | −2 | 7 | 30 | −4 | 1 |
| 14 | 0 | −1 | 4 | 31 | −3 | 1 |
| 15 | 0 | 0 | 2 | 32 | −2 | 0 |

TABLE 2

| phase | (6-tap) interpolation filter coefficients | | | | | |
|---|---|---|---|---|---|---|
| | e[−2] | e[−1] | e[0] | e[1] | e[2] | e[3] |
| 0 | 0 | 0 | 32 | 0 | 0 | 0 |
| 1 | 0 | −2 | 32 | 2 | 0 | 0 |
| 2 | 1 | −3 | 31 | 4 | −1 | 0 |
| 3 | 1 | −4 | 30 | 6 | −1 | 0 |
| 4 | 1 | −4 | 28 | 9 | −2 | 0 |
| 5 | 1 | −4 | 27 | 11 | −3 | 0 |
| 6 | 1 | −5 | 25 | 14 | −3 | 0 |
| 7 | 1 | −5 | 22 | 17 | −4 | 1 |
| 8 | 1 | −5 | 20 | 20 | −5 | 1 |
| 9 | 1 | −4 | 17 | 22 | −5 | 1 |
| 10 | 0 | −3 | 14 | 25 | −5 | 1 |
| 11 | 0 | −3 | 11 | 27 | −4 | 1 |
| 12 | 0 | −2 | 9 | 28 | −4 | 1 |
| 13 | 0 | −1 | 6 | 30 | −4 | 1 |
| 14 | 0 | −1 | 4 | 31 | −3 | 1 |
| 15 | 0 | 0 | 2 | 32 | −2 | 0 |

Table 3 comprises a look-up-table of interpolation-filter coefficients for a 16-phase 4-tap interpolation filter wherein the phase corresponds to the interpolation position determined by $(p_{x,L}(x), p_{y,L}(y))$.

TABLE 3

| phase | (4-tap) interpolation filter coefficient | | | |
|---|---|---|---|---|
| | e[−1] | e[0] | e[1] | e[2] |
| 0 | 0 | 128 | 0 | 0 |
| 1 | −4 | 127 | 5 | 0 |
| 2 | −8 | 124 | 13 | −1 |
| 3 | −10 | 118 | 21 | −1 |
| 4 | −11 | 111 | 30 | −2 |
| 5 | −11 | 103 | 40 | −4 |
| 6 | −10 | 93 | 50 | −5 |
| 7 | −9 | 82 | 61 | −6 |
| 8 | −8 | 72 | 72 | −8 |
| 9 | −6 | 61 | 82 | −9 |
| 10 | −5 | 50 | 93 | −10 |
| 11 | −4 | 40 | 103 | −11 |
| 12 | −2 | 30 | 111 | −11 |
| 13 | −1 | 21 | 118 | −10 |
| 14 | −1 | 13 | 124 | −8 |
| 15 | 0 | 5 | 127 | −4 |

Figure 3:
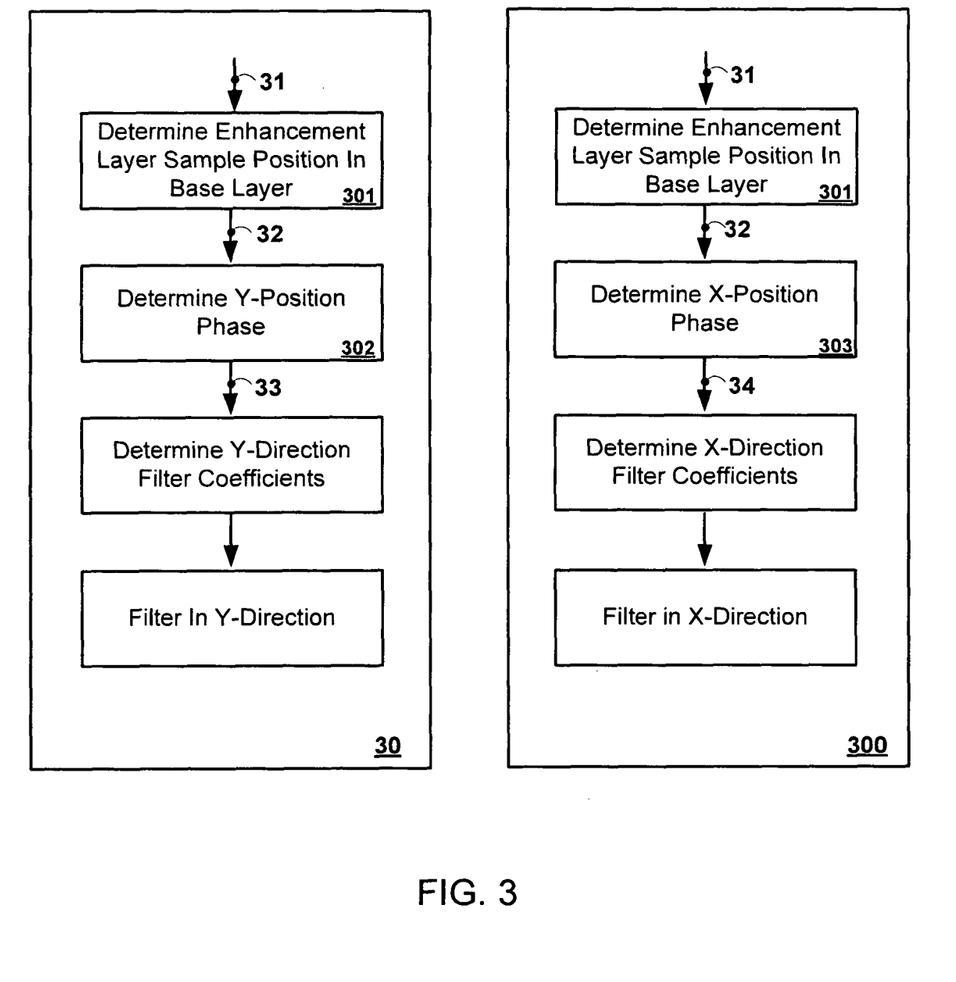
FIG. 3 is a flow diagram of an embodiment of the present invention comprising interpolation filtering in two directions.
Figure 4:
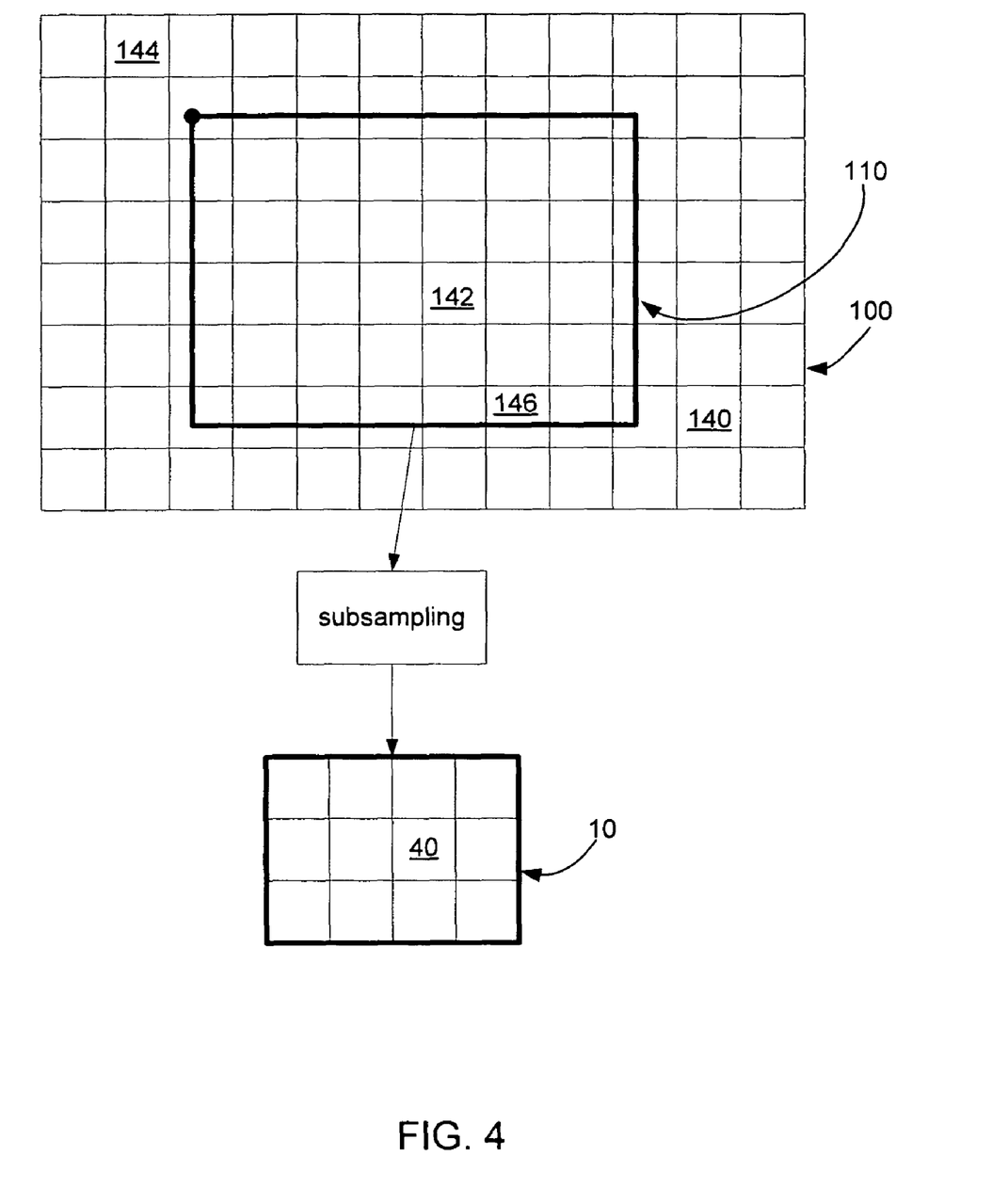
FIG. 4 is a diagram illustrating the relationship between macroblocks in an enhancement layer and a base layer.
Figure 5:
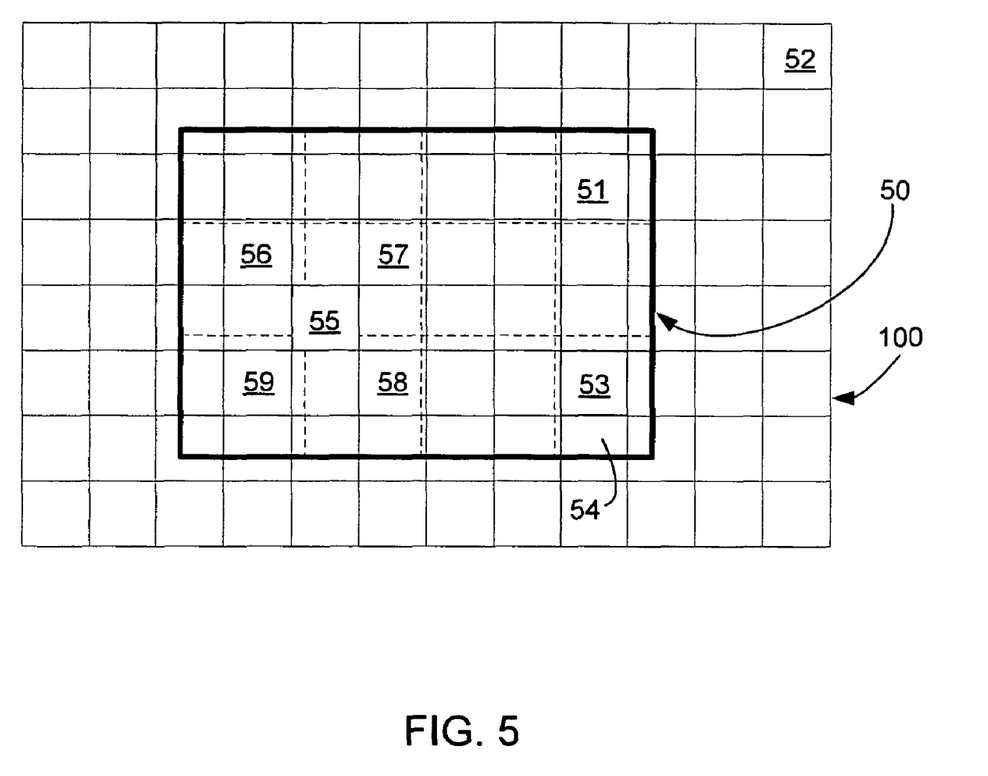
FIG. 5 is a diagram illustrating the relationship between macroblocks in an enhancement layer and a base layer.

Some embodiments of the current invention are illustrated in FIG. 3. Interpolation in the x- and y-directions may be done in separate passes, 300 and 30, respectively. In some embodiments, each pass may be performed within a macroblock or another sub-division of the image. In other embodiments, each pass may be performed within the entire image.

For a sample position in the enhancement layer 31, i.e., the location of an enhancement-layer pixel, the corresponding position in the base layer 32 may be determined 301. The offset, or phase, in each direction, y-position phase 33 and x-position phase 34, of the sample in the base layer from an integer base-layer pixel location may be determined, 302 and 303, respectively, from the corresponding base-layer pixel position 32 of an enhancement-layer pixel position 31. The offset or phase may be determined in units of interpolation resolution. For example, for an interpolation resolution of one-sixteenth, a phase of 0 may correspond to no offset from a base-layer pixel position. A phase of 8 may correspond to an enhancement-layer pixel that falls, in one dimension, halfway between base-layer pixel positions.

The interpolation filter coefficients may be determined by look-up-table in which the y-position phase 33 may be the index when interpolating in the y-direction, or the x-position phase 34 may be the index when interpolating in the x-direction. The position interpolation center, for a given direction, is the pixel location in the base layer with respect to which the position phase may be measured. In some embodiments of the current invention, the position interpolation center is the pixel location to which the filter is centered.

Interpolation—Down-Sampling

Down-sampling filters can be selected from a pre-defined set of filters, in some embodiments. Down-sampling filters may also be calculated on-the-fly or modified in relation to position or other image parameters. However, the down-sampling process is not a normative part of the SVC.

Syntax and Signaling

Figure 9:
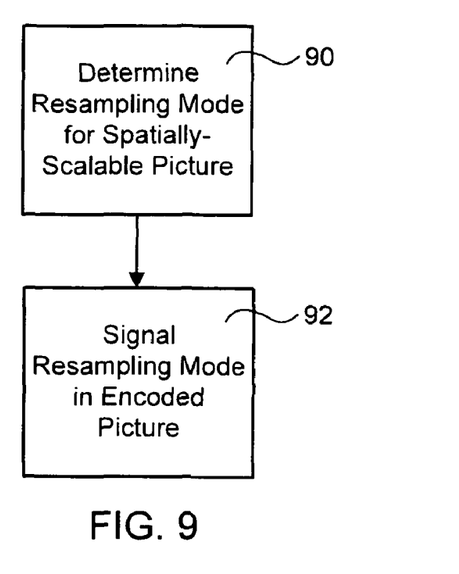
FIG. 9 is a diagram illustrating an embodiment of the present invention comprising resampling mode signaling.

Some embodiments of the present invention may be described with reference to FIG. 9. In these embodiments, a resampling mode is determined 90 for a spatially-scalable picture. This is typically done during the encoding process. Since multiple mode are available, this resampling mode must be signaled 92 with the encoded image. In some embodiments, the resampling mode may be encoded with the image bitstream as a flag. Some exemplary embodiments are described in the following sections.

New Syntax Element in Sequence Parameter Set of SVC

|  | C | Descriptor |
|---|---|---|
| seq_parameter_set_rbsp( ) { | | |
| ... | | |
| if(profile_idc == 83 ){ | | |
| ... | | |
| base_frame_progressive_only_flag | 0 | u(1) |
| if( base_frame_progressive_only_flag ) | | |
| base_frame_from_field | 0 | u(2) |
| ... | | |
| } | | |
| ... | | |
| } | | |

In some embodiments of the present invention, which are related to the JVT standard, to support all possible cases described above, a new sequence-level signal should be added to the Sequence Parameter Set (SPS) of the SVC extension. The flag (for example, "base_frame_progressive_only_flag") is to specify whether the base layer pictures are either all progressive frames or all interlaced materials.

For interlaced base pictures, processes described above in relation to field-to-field resampling or field-to-frame resampling may be invoked. (Note: this will cover the case of adaptive frame/field coding.)

When the base layer pictures are all progressive frames, another signal (for example, "base_frame_from_field") may be sent to specify whether a base frame picture is derived from a top field, a bottom field, or a frame in the enhancement frame. And, processes described above in relation to frame-to-field resampling or the frame-to-frame special case may be invoked for interlaced enhancement pictures. Of course, by default, the existing resampling procedure may be applied to handle resampling between progressive frames.

In some embodiments, the signals may be sent explicitly for each SPS. However, in alternative embodiments, they may be sent only when the "frame_mbs_only_frame" of the enhancement picture is "0".

In some embodiments, the same signals can also be used for other inter-layer prediction decisions (especially inter-layer mode/motion prediction) in addition to the texture prediction.

New Syntax Element in Slice Header of SVC base_frame_from_bottom_field_flag equal to 0 indicates the base frame picture (i.e., the frame picture with dependency_id equal to DependencyIdBase) is derived from a top field picture in the current layer. base_frame_from_bottom_field_flag equal to 1 indicates the base frame picture (i.e., the frame picture with dependency_id equal to DependencyIdBase) is derived from a bottom field picture in the current layer. When base_frame_from_bottom_field_flag is not present, it shall be inferred to be equal to 0.

base_bottom_field_coincided_flag equal to 0 indicates the top field of the base frame picture (i.e., the frame picture with dependency_id equal to DependencyIdBase) is coincided with the current frame picture in the current layer. base_bottom_field_coincided_flag equal to 1 indicates the bottom field of the base frame picture (i.e., the frame picture with dependency_id equal to DependencyIdBase) is coincided with the current frame picture in the current layer. When base_bottom_field_coincided_flag is not present, it shall be inferred to be equal to 0.

The related existing H.264 symbols are defined as follows.

frame_mbs_only_flag specifies whether the sequence of the current layer is coded as progressive frame pictures or interlaced frame/field pictures.

base_frame_mbs_only_flag is equal to frame_mbs_only_flag of the base picture.

field_pic_flag specifies whether the current picture is a field picture or frame picture.

base_field_pic_flag is equal to field_pic_flag of the base picture.

Alternative Resamplig Filters

Interlaced-materials-related embodiments described above comprise solutions for resampling phase position issues, however the specific filter design is not fixed. In some embodiments, the default direct interpolation filters described above and in the incorporated JVT documents in relation to non-interlaced materials may be applied to up-sampling of interlaced materials as well. However, there is no any restriction on alternative filter designs, including sequence- or picture-level adaptive filter selections for other embodiments.

Other Embodiments

As specified in the SVC, the residual interpolation positions may be derived using the same equations for texture interpolation; however, the simple bilinear interpolation fil-

| | | | |
|---|---|---|---|
| ■ → → if( base_frame_mbs_only_flag && !frame_mbs_only_flag && !field_pic_flag) | | | |
| ■ → → → base_frame_from_bottom_field_flag | 2 | u(1) | |
| ■ → → else if( !frame_mbs_only_flag && !base_frame_mbs_only_flag && !base_field_pic_flag ) | | | |
| ■ → → → base_bottom_field_coincided_flag | 2 | u(1) | |

In some embodiments, a more flexible option for the signaling is to have a couple single-bit flags inserted to the SVC slice header, e.g., base_frame_from_bottom_field_flag and base_bottom_field_coincided_flag.

In some exemplary embodiments, which are related to the JVT standard, one or more of the following flags may be used:

ters should be applied for the residual up-sampling in SVC-related embodiments to be consistent with current SVC design.

Many equations in this document have been explicitly written for direct interpolation with $1/16$-sample accuracy. In other embodiments, the resampling accuracy may be modified to other than $1/16$ sample.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A system for picture resampling from a first resolution picture to a second resolution frame said system comprising:
 a) a position calculator for deriving a first resolution sample position corresponding to a sample position in a second resolution field;
 b) a data manager for managing filter data wherein said filter data is related to said first resolution sample position;
 c) a filter for filtering said first resolution picture based on said filter data thereby producing a filtered field;
 d) an opposite-parity position calculator for deriving an opposite-parity first resolution sample position corresponding to an opposite-parity sample position in an opposite-parity second resolution field;
 e) wherein said data manager is also capable of managing opposite-parity filter data wherein said opposite-parity filter data is related to said opposite-parity first resolution sample position; and
 f) an opposite-parity filter for filtering a first resolution opposite-parity field based on said filter data thereby producing an opposite-parity filtered field.

2. A system as described in claim 1 further comprising an interpolator for interpolating said filtered field, thereby producing an opposite parity field.

3. A system as described in claim 1 wherein said first resolution picture is an interlaced field.

4. A system as described in claim 1 wherein said filter data comprises a filter coefficient.

5. A system as described in claim 1 further comprising a phase calculator for determining a phase of said first resolution sample position.

6. A method for picture resampling from a first resolution picture to a second resolution frame said method comprising:
 a) deriving an opposite-parity first resolution sample position corresponding to an opposite-parity sample position in an opposite-parity second resolution field;
 b) determining opposite-parity filter data wherein said opposite-parity filter data is related to said opposite-parity first resolution sample position; and
 c) filtering a first resolution opposite-parity field based on said filter data thereby producing an opposite-parity filtered field.

7. A method as described in claim 6 further comprising interpolating said filtered field, thereby producing an opposite parity field.

8. A system for picture resampling from a first resolution picture to a second resolution frame said system comprising:
 a) deriving a first resolution sample position corresponding to a sample position in a second resolution field;
 b) determining filter data wherein said filter data is related to said first resolution sample position;
 c) filtering said first resolution picture based on said filter data thereby producing a filtered field;
 d) deriving an opposite-parity first resolution sample position corresponding to an opposite-parity sample position in an opposite-parity second resolution field;
 e) determining opposite-parity filter data wherein said opposite-parity filter data is related to said opposite-parity first resolution sample position; and
 f) filtering a first resolution opposite-parity field based on said filter data thereby producing an opposite-parity filtered field.

* * * * *